United States Patent [19]

Perco et al.

[11] 4,431,860

[45] Feb. 14, 1984

[54] MULTISTRANDED COMPONENT CONDUCTOR CONTINUOUSLY TRANSPOSED CABLE

[75] Inventors: Daniel D. Perco, Hamilton; Paul V. Birke, Burlington, both of Canada

[73] Assignee: Westinghouse Canada Inc., Hamilton, Canada

[21] Appl. No.: 381,407

[22] Filed: May 24, 1982

[30] Foreign Application Priority Data

Aug. 13, 1981 [CA] Canada .................................. 383855

[51] Int. Cl.[3] .......................... H01B 7/30; H02K 3/14

[52] U.S. Cl. ................................ 174/34; 174/113 A; 310/213; 336/187

[58] Field of Search ................. 174/34, 113 A, 129 R; 310/213; 336/187

[56] References Cited

U.S. PATENT DOCUMENTS

| | | | |
|---|---|---|---|
| 587,764 | 8/1897 | Short | 174/129 R |
| 2,234,996 | 3/1941 | Welch, Jr. et al. | 174/34 |
| 2,249,509 | 7/1941 | Welch, Jr. et al. | 174/34 |
| 2,978,530 | 4/1961 | Braeckman | 174/34 |
| 3,188,377 | 6/1965 | Hughes | 310/213 |
| 3,602,860 | 8/1971 | Moore et al. | 336/187 |
| 3,647,932 | 3/1972 | Heller et al. | 174/34 |

FOREIGN PATENT DOCUMENTS

| | | | |
|---|---|---|---|
| 145375 | 7/1920 | United Kingdom | 310/213 |

*Primary Examiner*—J. V. Truhe
*Assistant Examiner*—Morris H. Nimmo
*Attorney, Agent, or Firm*—E. H. Oldham

[57] ABSTRACT

This invention relates to an electrical cable useful in large power transformers and reactors. The cable is composed of a plurality of separate ropes which are generally of the same size and configuration which may be combined in accordance with a predetermined plan to form a complete cable.

3 Claims, 8 Drawing Figures

Figures 1, 2A, 2B, 2C, 2D, 2E, 2F, 3:
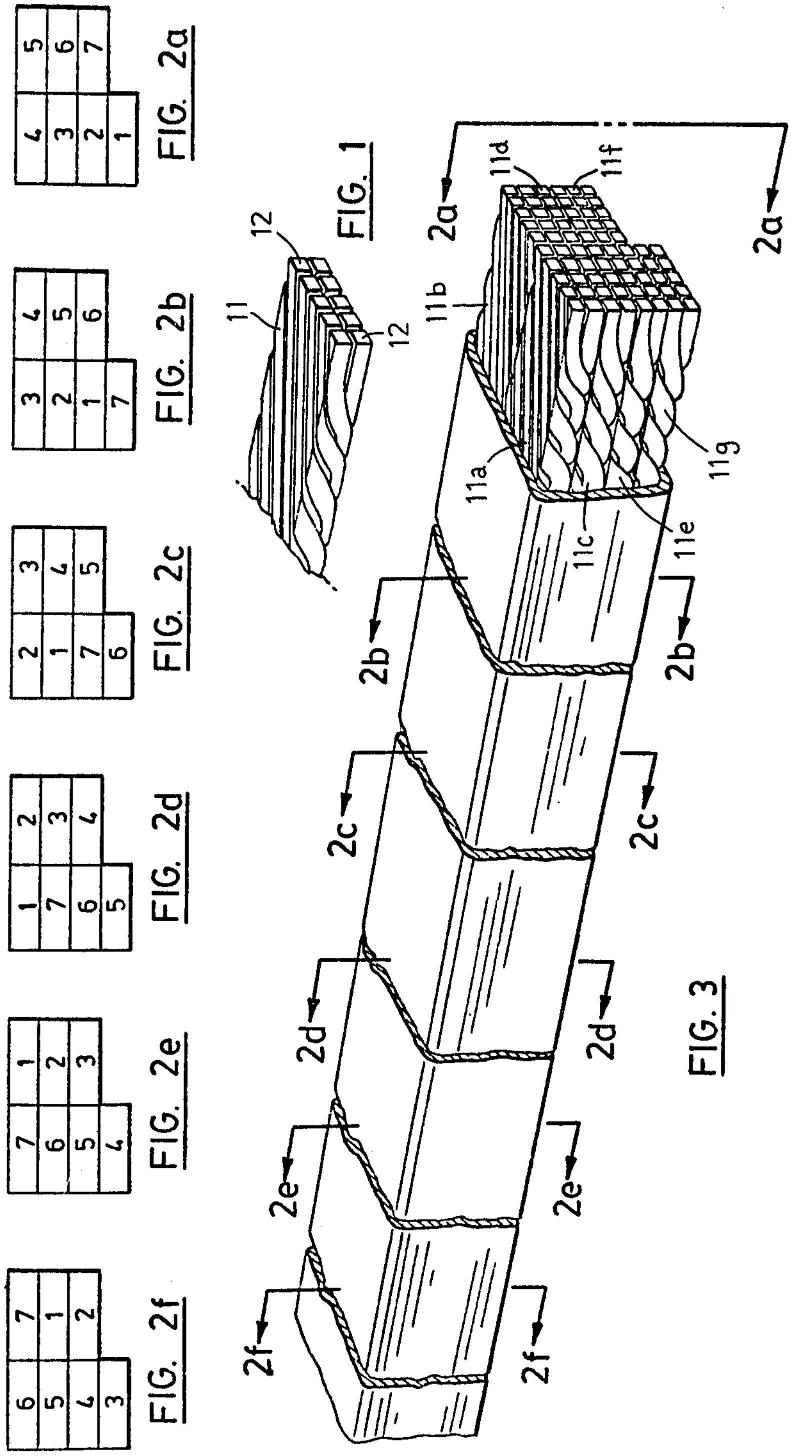

11
12

11a
11b
11c
11d
11e
11f
11g
2a
2b
2c
2d
2e
2f

MULTISTRANDED COMPONENT CONDUCTOR CONTINUOUSLY TRANSPOSED CABLE

In the evolutionary process of power transformer manufacturing, changes are generally accepted with great reservation and most innovations are accepted slowly and with great reluctance. As the public becomes more aware of the need to conserve energy, the transformer designer is constantly seeking ways to improve the efficiency of a modern power transformer. Much effort has gone into the design of efficient core structures but as yet little effort has been directed to cutting down the losses in the windings of the transformer. It is to improve the losses in the windings of the transformer that this invention is directed.

Traditionally transformer windings have been manufactured by taking a plurality of strands of insulated copper wire of a rectangular cross section, and combining them into a cable such that all the individual copper strands are uniformly and continuously transposed along the length of the cable. See U.S. Pat. No. 2,249,509 issued July 15, 1941. This patent shows the conventional continuously transposed five strand cable which is suitably adapted for transformer windings in the transformer industry. The five strand cable utilizes five rectangularly shaped strands which are coated with an enamel insulation and is continuously transposed so that each strand occupies each of the five positions an equal amount of the length of the cable. The entire cable is generally finished by winding strips of kraft paper around the cable in overlapping helical fashion. The resulting cable is somewhat flexible and may be bent to a fairly small radius. Until recently little thought had been given to improving the eddy current losses in this cable. However, it now appears that with the advent of a flattened compressed strand rope consisting of a plurality of reliably insulated strands, improvement in both eddy current losses and flexibility of the cable will result from this invention. Seven strand continuously transposed cable similar to the five strand above is widely utilized in the transformer industry.

The invention preferably utilizes a 2×5 strands of flattened insulated conductors which have been compressed during the flattening operation to form a unitary flattened rope which for all practical purposes appears to have the same properties as a very flexible flat strand, except the flattened rope has a good deal more flexibility in both axes. Such a flattened rope has been developed for other purposes and is now commercially available. As a result the completed cable may be used for a wider spectrum of applications and with increasing emphasis on increased efficiency the cable finds wide acceptance in both transformer or reactor applications.

Referring now to the drawings:

FIG. 1 is a perspective view (magnified) to show the compressed rope used in the manufacture of the complete cable;

FIGS. *2a–2f* show representative sectional views of various segments of the cable; and FIG. 3 is a perspective view of the cable showing the location of various sections of FIGS. *2a–2f.*

Referring now to FIG. 1, a flattened rope 11 shown is composed of 10 insulated copper strands 12 which have been compressed into a flattened strip which generally is a two layered rope having five strands per layer. Such a rope developed for other purposes is now available from normal wire suppliers and is produced by compressing the rope through a series of roller dies.

The rope 11 shown in FIG. 1 is extremely flexible in comparison to a solid rectangular copper strand of the same current carrying capacity.

FIG. 2 shows the completed cable composed of seven ropes 11*a* to 11*g* as illustrated in FIG. 1 which are arranged in a cable in a continuously transposed arrangement as would usually be done with a cable composed of seven solid insulated copper strands (See FIGS. *2a* to *3f* for various sections of FIG. 2). It will be noted that because of the extreme flexibility, the ropes forming the cable may be easily transposed and the resultant cable is wrapped in a layer of suitable paper 13 to protect and further insulate the completed cable. This is a standard procedure in completing the cable manufacture. Such a transposed complete cable is disclosed for e.g. in U.S. Pat. No. 2,249,509 issued July 15, 1941 to A. U. Welch Jr. et al which discloses both the cable and a process for manufacture. Such processes and equipment have been well known for many years as will be seen from the date of this patent and are well known to those skilled in the art. The difference between the present cable and the cable disclosed in Welch et al lies in the use of the rectangular compressed rope which has advantages as explained.

The completed cable as shown in FIG. 2 is very flexible and will easily flex in any direction as opposed to prior art cables which generally are somewhat flexible along one axis only.

As far as losses are concerned, it will be seen that the completed cable will outsurpass the prior art solid strand cable of the same current carrying capacity in reducing the eddy current losses per unit length.

Thus the resultant cable is extremely flexible and the reduced eddy current losses per unit length of cable is drastically reduced over prior art cables.

Although the embodiment shown uses a compressed flattened wire rope as the fundamental integer of the completed cable, other compressed rope such as the compressed rope as shown in U.S. Pat. No. 2,978,530 issued Apr. 4, 1961 may be also used to form the fundamental integer of the completed cable. Again this patent illustrates a cable formulated from round cable formulated from insulated strands and compressed to form a rectangular cross section. The resultant compressed cable is very flexible and again may be used in most transformer and reactor windings with a substantially reduced eddy current loss. The final completed cable is wound in a helix of overlapping kraft paper.

It will therefore be seen that this invention provides a cable which has a great current carrying capacity but also is flexible enough to permit use where the cable must be bent to a small radius and yet the superior eddy current loss provides an excellent saving throughout the life of the cable in the inductive apparatus where finds its best use.

We claim as our invention:

1. A cable for use in an electrical apparatus comprising:

a plurality of ropes of electrical conductors all of which ropes are continuously transposed along the length thereof, said ropes being formed by a plurality of separate electrical conductors, wherein each conductor is coated with a suitable layer of insulation.

2. A cable as claimed in claim 1 wherein each rope comprises a plurality of separately insulated conductors, each conductor being transposed along the length of said rope, each rope being compressed to form a substantially flat strip of compressed conductors.

3. A cable as claimed in claim 1 wherein each rope comprises a plurality of separately insulated conductors, each rope being compressed to form a rope having a substantially rectangular cross section, each conductor near the outside of said rope being transposed, said cable being wrapped in a helix of overlapping kraft paper.

* * * * *